United States Patent [19]

Whitworth et al.

[11] 3,884,861
[45] May 20, 1975

[54] SOIL GROUTING PROCESS AND COMPOSITION

[75] Inventors: Anthony J. Whitworth; Stephen Yi-Sun Tung, both of Scarsborough, Ontario; Ernest Anthony Hajto, Willowdale, Ontario, all of Canada

[73] Assignee: Borden, Inc., Columbus, Ohio

[22] Filed: Apr. 12, 1974

[21] Appl. No.: 460,424

Related U.S. Application Data

[60] Continuation of Ser. No. 271,530, July 13, 1972, which is a division of Ser. No. 51,359, June 30, 1970, Pat. No. 3,686,872.

[30] Foreign Application Priority Data

May 19, 1970 United Kingdom............... 24269/70

[52] U.S. Cl. ............ 260/29.3; 106/287 SS; 260/46; 260/57 R; 260/57 C
[51] Int. Cl............................................ C08g 51/24
[58] Field of Search......... 260/29.3, 46, 57 R, 57 A, 260/57 B; 106/287 SS

[56] References Cited
UNITED STATES PATENTS 3,025,250  3/1962  Herrick et al...................... 260/17.2
3,391,542  7/1968  Herrick et al...................... 260/29.3
3,615,780  10/1971  Kim et al. ............................. 106/80

OTHER PUBLICATIONS

Chem. Abstract, 54: 9443e, "The Effect of Soluble Salts on Gelation of Tannin–Formaldehyde".

*Primary Examiner*—Lorenzo B. Hayes
*Attorney, Agent, or Firm*—George P. Maskas, Esq.; George A. Kap, Esq.

[57] ABSTRACT

In a process for stabilizing soil by impregnation with an alkaline aqueous gel-forming composition containing (a) a polyphenolic material such as a vegetable tannin extract and (b) a formaldehyde compound such as paraformaldehyde, a surprising improvement in control of gelling rate is achieved by including in said composition a precalculated amount of (c) gelling agent dispersible in said composition and containing a complexing element selected from silicon, vanadium, molybdenum, manganese, titanium, copper, zinc and zirconium.

2 Claims, No Drawings

SOIL GROUTING PROCESS AND COMPOSITION

BACKGROUND OF THE INVENTION

This is a continuation, of application Ser. No. 271,530 filed July 13, 1972, which in turn was a divisional application of application Ser. No. 51,359 filed June 30, 1970, now U.S. Pat. 3,686,872 which issued Aug. 29, 1972.

This invention relates to a grouting process and grouting compositions for stabilizing soil. Grouting is the term used to denote the process of stabilizing sand, soil or similar substrates in order to increase the strength and load bearing characteristics of the area and to seal off water or liquid flows in the grouted area. Such consolidation of loose soils and subsoils by impregnating, mixing with or injecting into the soil, substances having a binding action is of great importance in many civil engineering, mining and drilling operations. There is, therefore, a demand for compositions which can be injected into porous ground so as to form a substantially compact and impervious mass.

The term "soil" is used herein to designate any geological matter having sufficient porosity to permit impregnation by the method of the present invention. The present invention has particular utility in the treatment of subterranean strata of finely porous structure, such as sandstone, by injecting the grouting composition into the strata under pressure, e.g. any pressure above atmospheric, depending on the porosity of the soil.

In British Patent Specification No. 1,122,308, a method is described and claimed for the stabilization of soil which comprises treating the soil with an aqueous liquid composition comprising (a) a vegetable tannin extract, (b) formaldehyde and/or paraformaldehyde or a water-soluble phenol-formaldehyde resole and (c) an alkalimetal hydroxide and allowing the treated soil to harden.

While this method is effective for the purposes intended, the compositions used therein require such long periods of time to solidify or gel that in certain locations where the soil is very porous, large quantities of grouting solution are lost by seeping too far into the porous structure before the penetrated mass is made impervious. Because it is thus difficult to control, modify or accelerate the gelling time, cumbersome adaptations in procedure must be made to decrease flow rate such as adding varying amounts of polymeric thickening agents to increase viscosity or such as making fine adjustments in the injection pressure. Furthermore it is difficult to get good results with the method of the above cited patent when the ground to be grouted is cold, the cost of using hot grouting solutions being prohibitive and difficult to control.

More specifically, with tannin formaldehyde grouting solutions of the above cited patent, even with addition of 4 percent of a water-soluble salt of calcium, magnesium or aluminum as suggested therein, gelation times of approximately 2 hours or longer are encountered at 25°C. At temperatures less than 25°C. the gel time increases as the temperature is lowered until at around 7°C. it is extremely difficult to obtain any gel at all and the composition is ineffective as a grouting material. Similar deficiencies are experienced with systems in which all or part of the tannin is replaced by catechins or by polyphenolic materials obtained by extraction of coniferous tree barks.

As to other types of grouting methods and compositions which have been proposed, on one hand there are the traditional procedures based on cement and on the other hand there are several "chemical grouts" which have aimed to overcome the deficiencies of cement but which themselves have various deficiencies. The severe limitations of cement result from the fact that the grout itself is particulate and is consequently unable to penetrate fine substrates. Furthermore, cement systems have relatively long and uncontrollable curing rates which make cement grouts impractical for cutting off fast flowing water.

Among the chemical systems, one based on the polymerization of acrylamide and NN-methylene bisacrylamide has the disadvantages of high cost, high toxicity, low structural strength and considerable contraction in the absence of water. Another based on magnesium acrylate, methylene bisacrylamide and acrylonitrile has similar disadvantges. A chrome-lignin process has the disadvantages that hexavalent chromium is toxic and hazardous to handle; also the viscosities of the initial grout solutions before gelling are excessively high.

Grouts have also been disclosed with sodium silicate as principal component in admixture with reagents such as lime slurry, sodium bicarbonate, copper sulfate and aluminum salts. In such prior art compositions the silicate content is between about 30 to 50 percent, the strengths of gel obtainable are low and there is no perceptible increase in the strength of the grouted soil.

SUMMARY OF THE INVENTION

A method has now been found whereby an aqueous alkaline polyphenolic-formaldehyde grouting composition can be made to gel in a precalculated time by including in said composition a carefully controlled proportion of a compound dispersible therein and derived from an element selected from silicon, vanadium, molybdenum, manganese, titanium, copper, zinc and zirconium.

Since these elements all possess the tendency to form complexes in alkaline aqueous solution with water and with hydroxyl ions, they are designated herein as complexing elements.

Most of these complexing elements form true solutions in the aqueous grouting compositions, being present largely as hydroxylated or hydrated anions such as silicate, vanadate, molybdate, zincate, and the like. However in some instances, at least part of the element present is contained in the form of a colloid dispersion or hydrosol such as zinc hydroxide hydrosol. The terms "dispersible" and "dispersion" as used herein are intended to include "soluble" and "solution" respectively.

Unexpectedly, compositions of the present invention are capable of forming gels quite rapidly at temperatures close to freezing, as for example at 5°C.

Briefly stated, the method of this invention includes the steps of (A) treating the soil with an aqueous alkaline gel-forming liquid comprising (a) a polyphenolic material selected from vegetable tannin extracts, catechins and tree bark extracts, said polyphenolic material being soluble in alkalin solution, able to gel rapidly and able to combine with formaldehyde (b) a formaldehyde compound selected from formaldehyde, paraformaldehyde and a water-soluble phenolformaldehyde resole and (c) a gelling agent dispersible in said composition and containing a complexing element selected from silicon, vanadium, molybdenum, manganese, titanium, copper, zinc and zirconium; and (B) allowing the treated soil to form a substantially compact mass. The invention also includes the grouting compositions used in carrying out said method.

By careful control of the relative proportion of the gelling agent, the time required to form the gel or solid phase of the grouted structure can be precisely controlled to take place over a period selected from the range from about one second to several hours after injection, as needed for suitable placement of the grout.

It has been surprisingly found that gelling agents of this invention not only accelerate the gelling action but also result in a grouted structure which has a stronger resistance to compressive forces than is developed by the same composition without the gelling agent.

The gelling agents of this invention are effective in relatively small amounts, some of the advantages of the invention being observable with as little as 0.01% of complexing element based on weight of the polyphenolic material component. The efficacy of sodium silicate in such small amounts is surprising in comparison with the aforementioned grouts of prior art requiring solutions containing sodium silicate in concentrations as high as 30 to 50 percent by weight.

DETAILED DESCRIPTION

The grouting process and composition of this invention have the advantages that the raw materials used are cheap, readily available, dispersible in aqueous alkaline solution at low temperatures, and easy to apply on site.

The grouting process of this invention is capable of adjustment, by variation of the components, to have a large controllable range of gel times over a wide range of temperature and climatic conditions to achieve accurate placement of grout solution into the substrate.

Since the dispersions of this invention have low initial viscosity, comparable to water, deep penetration into finely pored substrates is facilitated. But when less deep penetration is desired, as when the soil is easily penetrated because of larger pore size, the relative proportion of gelling agent in the composition can be increased to attain quick gelation.

The compositions of this invention have relatively low toxicity and are easily handled by inexperienced operating personnel.

Treatment of soil with grouting compositions of this invention can produce grouted soil which is stable and possesses the required load bearing properties. The grouted substrate is also resistant to deterioration by atmosphere and by water.

Polyphenolic materials suitable for use in the present invention include vegetable tannins such as those extracted from mimosa, quebracho, mangrove and wattle; catechin and catechu such as extracted from acacia catechu and acacia suma, mahogany wood and the like; and the alkaline extracts of certain coniferous tree barks including the barks of Western hemlock Douglas fir, white fir, Sitka spruce and Southern yellow pine particularly such as prepared by the methods of U.S. Pat. Nos. 2,782,241; 2,819,295 and 2,823,223.

The preferred polyphenolic material is the readily available vegetable tannin extract known as mimosa extract, an extract from acacia mollissima, and the invention is illustrated by particular reference to this material. Other vegetable tannin extracts include those obtained from eucalyptus crebra, callitris calcarata and callitris glauca.

While all the aforementioned polyphenolic materials are commercially available, their exact chemical constitution is not known. Utility of a particular product in carrying out this invention is based on possession of three properties, namely solubility in alkaline solutions, ability to gel rapidly in the compositions of this invention and ability to combine with formaldehyde.

The ability to combine with formaldehyde is conveniently measured as the grams of formaldehyde which react in four hours with 100 grams of the dry commercial polyphenolic product dissolved in aqueous solution of pH 9.5. Such an alkaline solution containing accurately known amounts of polyphenolic product and of formaldehyde is allowed to stand for four hours, the remaining formaldehyde is accurately determined and the reacted formaldehyde is calculated by difference. A suitable method for determining formaldehyde is given by Lemme, Chem.Ztg. 27, 896 (1903). To be useful in the present invention the formaldehyde combining capacity of the polyphenolic material measured as the ratio of reacted formaldehyde to polyphenolic material on dry basis should be at least about 5.0.

The concentration of said polyphenolic material in the aqueous grouting dispersion can be in the range of about 2 to 45 percent. However, higher concentrations in this range correspond to dispersions of high viscosity and are applicable only when the soil has sufficiently high permeability. On the other hand, since the strength obtainable in the grouted soil decreases with decreased concentration of polyphenolic material, the lowest concentrations in the stated range are suitable only when it is sufficient to render the soil merely impervious. To obtain the benefits of high strength of grouted soil as well as the opportunity to control gel time, it is preferred to have the polyphenolic material at a concentration level of between about 4–27 percent, more particularly 7–23 percent of the weight of the aqueous composition.

The preferred amount of formaldehyde to be used in the compositions of this invention is between about 15 and 25 parts by weight to every 100 parts of polyphenolic material on a dry basis. There is no precise upper limit, but for reasons of economy and fume control it is not normally desirable to exceed 30 parts of formaldehyde to every 100 parts of polyphenolic solids. As to the lower limit, as little as 5 parts formaldehyde for every 100 of polyphenolic has been found effective. When sodium silicate is used as the gelling agent, it has been found that the formaldehyde can be omitted entirely.

Paraformaldehyde is the preferred source of formaldehyde because of its low tendency to fume and because it can be formulated with the tannin extract as a powder before dissolving to make the grouting solution.

An alternative source of formaldehyde is a water-soluble phenol formaldehyde resole such as prepared for example by reacting 1 molar proportion of phenol with 1.5 to 3 molar proportions of formaldehyde in the presence of an alkali metal hydroxide catalyst. Between about 2 and 3 parts by weight of such phenolic resole solids can be used in place of one part of formaldehyde.

The gelling agents of this invention can be selected from the aqueous alkali dispersible compounds of silicon, vanadium, molybdenum, manganese, titanium, copper, zinc and zirconium.

These complexing elements are amphoteric, all having in some degree the attributes of both metallic and non-metallic elements. Thus they are dispersible in the alkaline aqueous grouting composition of this invention largely as hydroxylated or hydrated anions. However, depending on the degree to which the metallic or non-metallic properties predominate, the solution may contain also cations or hydroxide hydrosol. Thus a zirconate solution contains a minor concentration of zirconium cations in equilibrium with the zirconate ions, and a zincate solution is known to contain some zinc hydroxide hydrosol.

The gelling agent can therefore be introduced into the aqueous grouting composition of this invention in a form in which the complexing element is already anionic, as in the case of the silicates and molybdates of the alkali metals. Alternatively, the gelling agent can be added to the alkaline composition in a form in which the complexing element is cationic or non-ionized and which is chemically converted on hydrolysis by an alkaline medium into a predominantly anionic form. The latter is the case, for example, when vanadium pentoxide is used as gelling agent; this substance is largely converted by hydrolytic action of the alkaline medium to the anionic form of vanadate. Likewise, it is known that the alkali soluble salts of zinc and zirconium cations can be present in alkaline solution as zincate and zirconate respectively.

In the instances where the complexing elements of this invention have a plurality of valence states their compounds are effective as gelling agents in the different valence states. Thus both cuprous and cupric compounds are gelling agents in the grouting composition of this invention.

In short, the gelling agent can exemplarily be an alkali-dispersible salt of silicate, vanadate, molybdate manganate, permanganate, titanate, cuprate, zincate or zirconate. Illustratively, such a salt can be a potassium, sodium, lithium or ammonium salt of any of these anions. Alternatively, the gelling agent can also be any chloride, sulfate, nitrate, hydroxide or oxide of any of the stated elements which compounds are dispersible in aqueous alkaline solutions. Illustratively, such compounds include zirconium tetrachloride, copper sulfate, manganous nitrate, zinc hydroxide and vanadium pentoxide.

In greater detail, examples of gelling agents which can be used in operating the method of this invention include sodium metasilicate ($Na_2SiO_3$), sodium metasilicate nonahydrate ($Na_2SiO_3 \cdot 9H_2O$), commercial sodium silicate solutions having different ratios of $Na_2O$ to $SiO_2$ such as "egg-preserver solution" containing about 40% $Na_2Si_3O_7$, potassium silicate of variable composition ($K_2Si_2O_5$ to $K_2Si_3O_7$), ammonium fluosilicate, vanadium pentoxide, vanadyl chloride, vanadyl trichloride, ammonium metavanadate, molybdenum trioxide, ammonium molybdate, sodium molybdate, potassium molybdate, manganous chloride, manganous nitrate, manganous sulfate, potassium manganate, potassium permanganate, ammonium permanganate, potassium titanate, sodium titanate, cuprous chloride, cupric chloride, cupric sulfate, zinc chloride, zinc sulfate, zinc oxide, zinc hydroxide, zirconium nitrate, zirconyl nitrate, and zirconium tetrachloride.

The preferred gelling agents, because of cheapness and facility of solution, are commercial grades of sodium silicate or vanadium pentoxide.

As to the amounts of gelling agent which can be used in carrying out this invention, extremely small quantities corresponding to as little as 0.01 percent of complexing element, based on the dry weight of polyphenolic material, have been found to be measurably effective on the rate of gellation. The amount required to obtain a desired gel time depends upon the dilution of the polyphenolic component and formaldehyde grouting components and the pH as well as the nature of the soil to be grouted and the identity of the gelling agent. Up to 10 percent of complexing element, based on dry polyphenolic material could be used under certain combinations of these parameters, but in the interest of economy, conditions which permit lower amounts are preferable. In general, amounts corresponding to between about 0.1 and 6.5 percent of complexing element based on polyphenolic solids are suitable.

In the typical practice of this invention, suitable polyphenolic material is dispersed in sufficient water containing sufficient alkali to form a dispersion of the desired concentration (in the range 2–45 percent by weight of solution) and the pH is adjusted to between 8.5 and 11.5 (preferably between 9.0 and 10.5) For the purpose of adjusting pH, sodium hydroxide, potassium hydroxide, sodium carbonate, potassium carbonate, or equivalent alkali can be used. The amount of alkali needed to attain such pH will depend on the particular polyphenolic material used. If the polyphenolic material is an alkaline extract, for example, it can be largely in the form of already neutralized sodium salts of the polyphenolic material, and only very small additional amounts of alkali may be required. There is then added the formaldehyde compound, as for example paraformaldehyde and this stock solution designated as Dispersion A.

A particularly convenient modification of this procedure is provided by first preparing a solid powder of the polyphenolic material and paraformaldehyde together with minor amounts of fillers such as sodium chloride and of various adjuvants such as preservatives, anti-dusting agents, anti-foam agents and the like. This powder is then shipped to the grouting site and used to prepare Dispersion A.

A second aqueous dispersion designated as Dispersion B is prepared with sufficient alkali to give substantially the same pH as in Dispersion A and with the amount of gelling agent to give the required concentration. Just prior to the grouting operation and/or during injection, the two dispersions A and B are fed through metered pumps and mixed thoroughly. The volume ratio of the two solutions can be varied to suit the application conditions which include density and porosity of soil, ambient temperature, mix-water temperature, and the gel strength and grout strength desired.

An alternative procedure is to place the formaldehyde in the same stock solution as the gelling agent. It is, of course, possible to add all three principal components in separate streams, but this has no particular advantage.

In order to gain maximum utility of the grouting operation it is extremely important to have accurate and close control of the length of time between the mixture of dispersions A and B and the injection of the mixture into the soil as well as of the time it takes to gel the composition. This control is made possible by controlling the relative amount of gelling agent used. The dependence of gel-time upon the concentration of the principal ingredients (polyphenolic, formaldehyde and gelling agent respectively) and in particular on the ratio of gelling agent relative to polyphenolic as well as on temperature and pH are illustrated in the examples given further below. The present inventors have found that the gel time can be varied at will from about one second to several hours by varying the type and amount of the gelling agent of this invention. Experiments have also shown that the inclusion of the gelling agent not only results in increased rate of gelation but also effects an increased resistance of the grouted structure to compressive forces. This increase in resistance to pressure goes through a maximum as the proportion of gelling agent is increased.

The invention will be further described in connection with the following examples which are set forth for the purpose of illustration only. In these examples and elsewhere herein proportions are in parts by weight unless specifically stated to the contrary.

EXAMPLE 1

A powdered mixture was made containing 75 parts by weight of mimosa extract, 13 parts of paraformaldehyde 10 parts of sodium chloride filler, 2 parts of dibutyl phthalate and 0.2 parts of carnea oil.

Twenty grams of this grouting powder was added to a solution of 3 grams sodium hydroxide in 67 grams of water. This solution is identified as Solution A.

To a solution of one gram sodium hydroxide in 96.5 grams of water there was added 2.5 grams of vanadium pentoxide. Within about ten minutes a clear solution resulted. This solution is identified as Solution B.

The 90 grams of Solution A was added to the receptacle of a Tecam Gelation Meter, and 10 grams of Solution B was added thereto with thorough mixing. Thus, the weight ratio of the complexing element vanadium to mimosa solids was 0.93 percent. The temperature of the solutions before mixing was 2°C. After mixing, the temperature reached 6.5°C. The pH was 11.8. The "gel time" needed to develop resistance to the fall of the plunger in the Tecam instrument was found to be 17.0 minutes as compared to the 500 minutes required at this temperature when Solution B is replaced by 10 grams of 1 percent aqueous sodium hydroxide and the gelling agent of the instant invention is absent.

EXAMPLE 2

The experiment of Example 1 was repeated excepting that the initial temperature of the solutions before mixing was 20°C. and the temperature of the mixture reached 28°C. The gel time was so short that it was difficult to measure precisely, being of the order of 0.1 minutes, as compared to the 80–100 minutes required at 28°C. without the help of gelling agent.

EXAMPLE 3

The procedure of Example 2 was followed except that the 2.5 grams of vanadium pentoxide in Solution B were replaced by 7.5 grams of an aqueous sodium metasilicate solution. The mixture thus contained 0.67 percent of elemental silicon based on the mimosa extract. Temperature of the solutions before mixing was 20°C. the mixture reached 27°C. and the gel time was 0.5 minutes.

EXAMPLES 4–8

The procedure of Example 2 was followed with the exception that the gelling agent used in successive experiments was respectively (Ex. 4) potassium permanganate, (Ex. 5) manganous sulfate, (Ex. 6) sodium molybdate, (Ex. 7) zirconium tetrachloride and (Ex. 8) titanium tetrachloride. In each case the pH of the mixture was in the range between 9 and 11. The accompanying table summarized the respective $a$ weight ratios of the complexing elements ($W_M$) in gelling agents based on tannin (mimosa) extract solids ($W_T$).$b$ the pertinent temperatures and $c$ the gel times. In all cases the gel time was shorter than the period of 2 hours or more obtained in the absence of any gelling agent of this invention. The range of gel times illustrates the utility of the instant invention in controlling gel time.

TABLE I

| Ex. | (a) % Weight ratio $W_M/W_T$ | (b) Temperature °C. Initial | Mixed | (c) gel time (mins.) |
|---|---|---|---|---|
| 4 | 2.32 | 20 | 28 | 25.0 |
| 5 | 2.18 | 20 | 28 | 31.0 |
| 6a | 2.66 | 20 | 28 | 43.0 |
| 6b | 2.66 | 25 | 32 | 22.3 |
| 7 | 2.48 | 20 | 28 | 62.5 |
| 8 | 1.67 | 9 | 35 | 92.0 |

EXAMPLES 9–11

Three experiments using vanadium pentoxide as gelling agent are summarized in Table II. Solutions were prepared according to the procedures of Example 1 except that the amount of vanadium pentoxide was varied so as to make the weight ratio of vanadium element to tannin solids equal to the values given in column $a$ and the pH of the mixture, as recorded in column $b$, was obtained by corresponding adjustments in the alkali content. Gel times, given in column $c$ were measured as before and comparative gel strengths after two days, given in column $d$ were evaluated using a "Precision" penetrometer and expressed as the distance in millimeters into the gel surface.

TABLE II

VANADATE AS GELLING AGENT AT 25°C.

| Ex. | (a) $W_M/W_T$ % | (b) pH | (c) gel time (Min.) | (d) Strength at 48 hrs. (mm) |
|---|---|---|---|---|
| 9 | 0.56 | 9.1 | 11 | 3.0 |
|  | .56 | 10.0 | 15 | 1.5 |
|  | .56 | 11.0 | 11 | 4.6 |
|  | .56 | 11.9 | 700 | 10.0 |
| 10 | .93 | 9.1 | 10 | 1.8 |
|  | .93 | 10.0 | 13 | 1.5 |
|  | .93 | 11.0 | 0.1 | 3.8 |
|  | .93 | 11.9 | 182. | 7.4 |
| 11 | 1.30 | 9.1 | 6 | 1.4 |
|  | 1.30 | 10.0 | 9 | 1.4 |
|  | 1.30 | 11.0 | 0.1 | 1.7 |
|  | 1.30 | 11.9 | 2. | 4.1 |
| WITHOUT GELLING AGENT | 0 | 9.1 | 99 | 20.0 |
|  | 0 | 10.0 | 50 | 2.4 |
|  | 0 | 11.0 | 457 | 9.2 |
|  | 0 | 11.9 | >1500 | — |

EXAMPLES 12–14

Three experiments using sodium silicate as gelling agent are summarized in Table III. Solutions were prepared according to the procedure of Example 3 except that the amount of sodium silicate was varied so as to make the weight ratio of silicon element to tannin solids equal to the values given in column $a$ and the pH of the mixture, as recorded in column $b$ was obtained by corresponding adjustments in the alkali content. Again gel times and gel strengths are recorded in columns $c$ and $d$ respectively.

TABLE III

Silicate As Gelling Agent at 25°C.

| Ex. | (a) $W_M/W_T$ % | (b) pH | (c) gel time (min) | (d) Strength (mm) at 48 hours |
|---|---|---|---|---|
| 12 | 0.17 | 9.1 | 62 | 6.2 |
|  | .17 | 10.0 | 22 | 1.4 |
|  | .17 | 11.0 | 35 | 2.6 |
| 13 | 0.27 | 9.1 | 77 | 5.2 |
|  | .27 | 10.0 | 11 | 1.4 |
|  | .27 | 11.0 | 21 | 2.5 |
|  | .27 | 11.9 | 1700 | — |
| 14 | 0.36 | 9.1 | 210 | 12.4 |
|  | .36 | 10.0 | 5 | 1.4 |
|  | .36 | 11.0 | 7 | 2.2 |
|  | .36 | 11.9 | 1700 | — |

EXAMPLES 15-17

Three sets of experiments using vanadium pentoxide as gelling agent at 25°C. were carried out with three different concentration levels of the grouting composition, using respective 15, 20 and 25 grams of the grouting powder of Example 1 in formulating Solution A and using amounts of vanadium oxide such as to attain the values of $W_M/W_T$ recorded in Table IV. The results as to gel time and gel strength are also recorded in Table IV.

TABLE IV

VANADATE AS GELLING AGENT AT 25°C.
AT DIFFERENT CONCENTRATION LEVELS (m)
OF TANNIN SOLIDS

|  | % $W_M/W_T$ | Gel time (Mins) | Gel Strength at hrs | (mm) |
|---|---|---|---|---|
| Ex. 15 m= 11.3% pH= 10.3 | 0.72 | 109 | 4 | 19.5 |
|  |  |  | 24 | 9.3 |
|  |  |  | 48 | 2.4 |
|  | 1.07 | 52 | 1 | 26.3 |
|  |  |  | 4 | 17.2 |
|  |  |  | 24 | 8.3 |
|  |  |  | 48 | 2.0 |
|  | 1.42 | 0.7 | ¼ | 24.3 |
|  |  |  | 1 | 19.0 |
|  |  |  | 4 | 14.8 |
|  |  |  | 24 | 5.0 |
|  |  |  | 48 | 1.8 |
| Ex. 16 m= 15.0% pH= 11.0 | 0.40 | 211 | 4 | 21.4 |
|  |  |  | 24 | 9.6 |
|  |  |  | 48 | 1.2 |
|  | 0.60 | 125 | 4 | 19.8 |
|  |  |  | 24 | 3.6 |
|  |  |  | 48 | 1.0 |
|  | 0.80 | 54 | 1 | 25.3 |
|  |  |  | 4 | 18.5 |
|  |  |  | 24 | 2.0 |
|  |  |  | 48 | 1.0 |
| Ex. 17 m= 18.7% pH = 10.7 | 0.13 | 16.0 | 1 | 7.6 |
|  |  |  | 4 | 4.0 |
|  |  |  | 24 | 1.3 |
|  |  |  | 48 | 0.8 |
|  | 0.21 | 1.4 | ¼ | 21.1 |
|  |  |  | 1 | 7.2 |
|  |  |  | 4 | 3.4 |
|  |  |  | 24 | 1.0 |
|  |  |  | 48 | 0.8 |

TABLE IV-Continued

VANADATE AS GELLING AGENT AT 25°C.
AT DIFFERENT CONCENTRATION LEVELS (m)
OF TANNIN SOLIDS

|  | % $W_M/W_T$ | Gel time (Mins) | Gel Strength at hrs | (mm) |
|---|---|---|---|---|
|  | 0.28 | 1.4 | 1 | 7.6 |
|  |  |  | 4 | 3.8 |
|  |  |  | 24 | 1.0 |
|  |  |  | 48 | 0.8 |

EXAMPLES 18-20

Three sets of experiments using sodium silicate as gelling agent at 25°C. were carried out with three different levels of the grouting composition, using respectively 15, 20 and 25 grams of the grouting powder of Example 1 in formulating Solution A and using amounts of sodium silicate in Solution B such as to attain the values of $W_M/W_T$ recorded in Table V. The results as to gel time and gel strength are also recorded in Table V.

TABLE V

SILICATE AS GELLING AGENT AT 25°C.
AT DIFFERENT CONCENTRATION LEVELS (m)
OF TANNIN SOLIDS

|  | % $W_M/W_T$ | gel time (Mins.) | gel strength at hrs. | (mm) |
|---|---|---|---|---|
| Ex. 18 m= 11.3% pH= 10.3 | 0.72 | 29 | 1 | 22.6 |
|  |  |  | 4 | 14.1 |
|  |  |  | 24 | 7.9 |
|  |  |  | 48 | 3.2 |
|  | 1.07 | 27 | 1 | 18.4 |
|  |  |  | 4 | 13.1 |
|  |  |  | 24 | 6.2 |
|  |  |  | 48 | 2.8 |
|  | 1.42 | 7.0 | ¼ | 19.8 |
|  |  |  | 1 | 14.8 |
|  |  |  | 4 | 10.4 |
|  |  |  | 24 | 5.4 |
|  |  |  | 48 | 2.8 |
| Ex.19 m= 15.0% pH= 11.0 | 0.40 | 2.5 | ¼ | 15.6 |
|  |  |  | 1 | 10.3 |
|  |  |  | 4 | 7.4 |
|  |  |  | 24 | 3.5 |
|  |  |  | 48 | 1.6 |
|  | 0.60 | 0.5 | ¼ | 6.2 |
|  |  |  | 1 | 5.1 |
|  |  |  | 4 | 3.3 |
|  |  |  | 24 | 1.7 |
|  |  |  | 48 | 1.1 |
|  | 0.80 | 0.3 | ¼ | 4.3 |
|  |  |  | 1 | 4.3 |
|  |  |  | 4 | 2.6 |
|  |  |  | 24 | 1.0 |
|  |  |  | 48 | 1.0 |
| Ex.20 m= 18.7% pH=10.7 | 0.13 | 2.0 | ¼ | 10.3 |
|  |  |  | 1 | 4.8 |
|  |  |  | 4 | 2.1 |
|  |  |  | 24 | 1.1 |
|  |  |  | 48 | 0.9 |
|  |  |  | 168 | 0.7 |
|  | 0.21 | 0.5 | ¼ | 9.8 |
|  |  |  | 1 | 4.6 |
|  |  |  | 4 | 2.1 |
|  |  |  | 24 | 1.0 |
|  |  |  | 48 | 0.8 |
|  |  |  | 168 | 0.5 |
|  | 0.28 | 0.1 | ¼ | 8.7 |
|  |  |  | 1 | 3.8 |
|  |  |  | 4 | 1.2 |
|  |  |  | 24 | 0.7 |
|  |  |  | 48 | 0.4 |
|  |  |  | 168 | 0.4 |

EXAMPLE 21

A solution was prepared from 15 parts of spray dried mimosa extract, 1.5 parts sodium hydroxide, 83.5 parts water and 7.5 parts of a 36 percent aqueous formaldehyde solution. Aliquots of this solution C were mixed with different amounts of 20 percent aqueous solution of sodium silicate in the proportions given in the first column of Table VI and the corresponding gel times obtained at room temperature are recorded in the last column of the same table.

TABLE VI

GEL TIMES WITH DIFFERENT LEVELS OF SODIUM SILICATE

| Parts 20% Na$_2$SiO$_3$ Per 100 parts of mimosa solution C | $W_M/W_T$ % | Gel Time (mins.) |
| --- | --- | --- |
| 10 | 3.27 | 0.67 |
| 6 | 1.96 | .75 |
| 2 | .654 | 1.20 |
| 1 | .327 | 6.00 |
| 0.6 | .196 | 20.3 |
| .2 | .065 | 48. |

EXAMPLES 22–24

Three sets of experiments using sodium molybdate as gelling agent at 25°C were carried out with three different levels of the grouting composition, using respectively 15, 20 and 25 grams of the grouting powder of Example 1 in formulating Solution A and using amounts of sodium molybdate in Solution B such as to attain the values of $W_M/W_T$ recorded in Table VII. The results as to gel time and gel strength are also recorded in Table VII.

TABLE VII

MOLYBDATE AS GELLING AGENT AT 25°C.
AT DIFFERENT LEVELS OF CONCENTRATION (m) OF TANNIN SOLIDS

| | $W_M/W_T$ % | Gel Time min. | Gel Strength (at hrs) | mm |
| --- | --- | --- | --- | --- |
| Ex. 22 m= 11.3% pH= 10.3 | 1.07 | 222 | 24 | 12.2 |
| | | | 48 | 10.0 |
| | 1.42 | 236 | 24 | 12.3 |
| | | | 48 | 7.0 |
| Ex. 23 m= 15.0% pH= 11.0 | 0.60 | 355 | 24 | 12.8 |
| | | | 48 | 8.5 |
| | 0.80 | 356 | 24 | 10.7 |
| | | | 48 | 7.4 |
| Ex. 24 m= 18.75 pH = 10.7 | 0.21 | 24 | 1 | 10.0 |
| | | | 4 | 5.0 |
| | | | 24 | 1.6 |
| | | | 48 | 0.9 |
| | 0.28 | 27 | 1 | 13.9 |
| | | | 4 | 5.0 |
| | | | 24 | 1.5 |
| | | | 48 | 0.9 |

EXAMPLE 25

This example illustrates application of the present invention at 5°C. Three forms of grout solution A were made as in examples 15–20 by using respectively 15, 20 and 25 grams of the grouting powder of Example 1. Two sets of such solutions and stock supplies of vanadium pentoxide and sodium silicate solution were brought to 5°C. At this temperature, amounts of the gelling agents were added to the respective grout solutions so as to make the weight ratio of complexing element to mimosa tannin equal to the values of $W_M/W_T$ given in Table VIII. The corresponding gel times observed are recorded also in Table VIII.

TABLE VIII

VANADATE AND SILICATE AS GELLING AGENTS AT 5°C.

| % Conc. of Tannin solids (m) | % $W_M/W_T$ | Gel Time (min) at 5°C. | |
| --- | --- | --- | --- |
| | | Vanadate | Silicate |
| 11.3 | 4.28 | 0.25 | 5.5 |
| 15.0 | 2.40 | .25 | 4.5 |
| 18.7 | 0.84 | 45.0 | 4.5 |

EXAMPLE 26

A series of grouting solutions was formulated with 15.0 percent mimosa tannin extract solids, 3.00 percent sodium hydroxide, 2.60 percent paraformaldehyde, 0.40 percent dibutyl phthalate and sufficient sodium silicate to make the ratio of silicon element to tannin solids equal to the $W_M/W_T$ values respectively given in Table IX.

Each of these solutions was rapidly mixed with 50–60 mesh foundry sand in the weight proportions 3 parts sand to 1 part grouting solution. The treated sand was immediately placed in a two-inch cubic mold and stored in mosture saturated atmosphere (100% R.H.). After the storage periods stated in the table, the grouted blocks were tested for their resistance to pressure in a hydraulic press. The pressure reached when the block crumbled was taken to be the compressive strength of the grouted structure. The results summarized in Table IX show that the inclusion of the gelling agent of this invention effects a substantial increase in the compressive strength.

TABLE IX

EFFECT OF Na$_2$SiO$_3$ ADDITIONS ON COMPRESSIVE STRENGTH OF SAND GROUTED WITH TANNIN AND FORMALDEHYDE

| $W_M/W_T$ % | Compressive Strength | | (psi) |
| --- | --- | --- | --- |
| | at 24 hrs | at 72 hrs | at 168 hrs |
| 0.00 | 80 | 92 | 100 |
| 0.09 | 95 | 90 | 138 |
| 0.17 | 85 | 102 | 153 |
| 0.27 | 85 | 102 | 149 |

EXAMPLE 27

This example illustrates how variations in the proportion of the gelling agent of this invention can be used to control the degree of resistance to pressure. Grouting solutions were formulated with the proportions of tannin, paraformaldehyde, sodium hydroxide and dibutyl phthalate as used in Example 26 and were mixed at 25°C. with the different amounts of silicate or vanadate gelling agents corresponding to the information in Table X. Each mixture was allowed to set to a height of about 4 inches in a metal tube 8 inches in height and 1.5 inches in diameter and having in its base several slits of dimensions approximately 1 × ⅝ inches and open at the top. The tubes containing gel were filled to the top with water at 25°C. and allowed to stand for a period of 24 hours. The tubes were then removed from the water and air pressure applied at the top of the tube. The pressure was increased gradually until the gel broke down and was extruded through the slits. The results summarized in Table X clearly indicate that the presence of the gelling agent of this invention in the amounts used substantially increased the pressure required to extrude the gel.

TABLE X

RESISTANCE OF GROUTING GELS TO PRESSURE AT 25°C

| Gelling Agent | $W_M/W_T$ % | Pressure (psi) required to extrude gel after 24 hrs under water |
|---|---|---|
| None | 0.00 | 15 |
| Silicate | 0.29 | 20 |
|  | 1.05 | 25 |
|  | 1.48 | 40 |
| Vanadate | 1.05 | 22 |
|  | 1.48 | 35 |

EXAMPLE 28

A glass tube 4 feet long and 4 inches in diameter was half filled with crushed gravel of size ⅝ to ¾ inches. Water was poured through the stones at approximately half a gallon per minute, maintaining a steady state with a 1-foot head of water above the stones.

An alkaline grouting solution was prepared in the proportions of Solution A in Example 1 and placed in a storage vessel situated above the column. An alkaline solution of vanadium pentoxide was made similar to Solution B of Example 1 except that 5 parts of $V_2O_5$ were used per 100 of solution; this solution was placed in a second storage vessel. The respective solutions were supplied under 5 psi pressure to a mixing chamber in the ratio of one part vanadate solution to three parts grouting solution.

Immediately after mixing, the mixture was injected into the stone column at about 6 inches below the surface of the stones. The positive pressure applied to the grouting solution displaced the flowing water and permitted a gel to form rapidly around the injection point. The grouting solution spread from this point of injection into the surrounding space and a plug of grouted stones built up quickly. The flow of water was slowed down immediately and was reduced to one tenth of its original rate within 5 minutes. Further addition of grout solution resulted in complete water cut-off. The gelled structure supported a 1-foot head of water for several days. This was in strong contrast to the performance of a corresponding grouting solution not containing the gelling agent of this invention but otherwise having the same composition; with such a solution it was impossible to form a gel, the solution being diluted by the flowing water before any gelling took place. Consequently no diminution in the flow of water was obtained.

It will be understood that it is intended to cover all changes and modifications of the Examples of the invention herein chosen for the purpose of illustration which do not constitute departures from the spirit and scope of the invention.

What we claim is:

1. An aqueous gel-forming composition, useful in stabilizing soil, having a pH of about 8.5–11.5 and containing dispersed therein
   a. between about 2 and 45 percent of a polyphenolic vegetable material selected from the group consisting of tannin extracts, catechins and alkaline extracts of coniferous tree barks, said polyphenolic material being soluble in alkaline solution, able to gel rapidly and having a formaldehyde combining capacity of at least 5.0,
   b. based on 100 parts of polyphenolic material, between about 5 and 30 parts of formaldehyde and/or paraformaldehyde or between about 10 and 90 parts of a phenol formaldehyde resole and
   c. a gelling compound, soluble or colloidally dispersible in said aqueous composition, said gelling compound being selected from the group consisting of the vanadates, molybdates, manganates, permanganates, titanates, cuprates, and zirconates of potassium, sodium, lithium and ammonium and the chlorides, sulfates, nitrates, hydroxides and oxides of vanadium, molybdenum, manganese, titanium, copper, zinc and zirconium, said compound being present in an amount corresponding to between about 0.01 and 10 parts of the vanadium, molybdenum, manganese, titanium, copper, zinc or zirconium therein per 100 parts of polyphenolic material.

2. The composition of claim 1 wherein the polyphenolic material is *a* tannin extract of mimosa, the formaldehyde material *b* is paraformaldehyde and the gelling compound *c* is vanadium pentoxide.

* * * * *

UNITED STATES PATENT OFFICE
CERTIFICATE OF CORRECTION

Patent No. 3,884,861     Dated May 20, 1975

Inventor(s) Anthony J. Whitworth; Stephen Yi-Sun Tung; Ernest A. Hajto

It is certified that error appears in the above-identified patent and that said Letters Patent are hereby corrected as shown below:

Column 9, line 31, change "respective" to --respectively--;

Column 12, line 28, change "mosture" to --moisture--;

Column 12, line 63, change "1 x 5/8" to --1 x 1/8--.

Signed and Sealed this second Day of September 1975

[SEAL]

Attest:

RUTH C. MASON
Attesting Officer

C. MARSHALL DANN
Commissioner of Patents and Trademarks